(12) United States Patent
Norris et al.

(10) Patent No.: US 6,504,979 B1
(45) Date of Patent: Jan. 7, 2003

(54) WATER BLOCKING OPTICAL FIBER CABLE

(75) Inventors: Richard H. Norris, Powder Springs, GA (US); Richard Dalton Small, Jr., Lilburn, GA (US); Peter A. Weimann, Atlanta, GA (US)

(73) Assignee: Fitel USA Corp., Norcross, GA (US)

(*) Notice: Subject to any disclaimer, the term of this patent is extended or adjusted under 35 U.S.C. 154(b) by 0 days.

(21) Appl. No.: 09/947,904

(22) Filed: Sep. 6, 2001

(51) Int. Cl.$^7$ ................................................. G02B 6/44
(52) U.S. Cl. ........................................................ 385/109
(58) Field of Search ................................. 385/102, 105, 385/106, 107, 109, 110, 112; 174/605, 63

(56) References Cited

U.S. PATENT DOCUMENTS

| | | | | |
|---|---|---|---|---|
| 4,909,592 A | * | 3/1990 | Arroya et al. | 385/113 |
| 5,642,452 A | * | 6/1997 | Gravely et al. | 385/103 |
| 5,649,041 A | * | 7/1997 | Clyburn et al. | 385/109 |
| 5,689,601 A | * | 11/1997 | Hager et al. | 385/100 |
| 5,905,833 A | * | 5/1999 | Sheu | 385/109 |
| 6,160,939 A | * | 12/2000 | Sheu | 385/100 |
| 6,173,100 B1 | * | 1/2001 | Newton et al. | 385/102 |
| 6,195,486 B1 | * | 2/2001 | Field et al. | 385/100 |

* cited by examiner

*Primary Examiner*—Tulsidas Patel
*Assistant Examiner*—Thanh-Tam Le
(74) *Attorney, Agent, or Firm*—Peter V. D. Wilde; Thomas, Kayden, Horstemeyer & Risley LLP

(57) ABSTRACT

The specification describes a water blocking tape for an optical fiber cable wherein the optical fibers in the cable are wrapped with a synthetic fibrous non-woven tape coated with a superabsorbent polymer powder coating. The particles in the powder are ultra-fine, i.e. have less than 10% weight fraction over 250 microns in diameter, and less than 2% weight fraction over 300 microns in diameter. Controlling the particle size within this small range is found to reduce microbending losses in the optical fiber.

18 Claims, 4 Drawing Sheets

WATER BLOCKING OPTICAL FIBER CABLE

FIELD OF THE INVENTION

This invention relates to optical fiber cables with means for preventing flooding of the cable due to unwanted water incursion. More specifically, it relates to cable water blocking techniques using superabsorbent polymer water blocking materials.

BACKGROUND OF THE INVENTION

Unwanted incursion of water into optical fiber cable sheaths is a well known problem in the cable industry. Changes in ambient conditions may lead to differences in vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of water.

Water also may enter the cable because of damage to the cable. For example, rodent attacks or mechanical impacts may cause openings in the sheath system of the cable to occur, allowing water to enter. If not controlled, the water is free to move longitudinally along the cable into splice closures, or terminal equipment, resulting in potential interruptions in service.

Past solutions for unwanted water incursions in optical fiber cable have included filling the void spaces in the manufactured cable with so-called cable plugging compounds. These materials are typically petroleum based compositions that, while relatively effective for controlling cable flooding, are very inconvenient for cable repair and splicing. They require cleaning the petroleum material from fibers prior to splicing, and from equipment and personnel. Extensive efforts in the fiber cable industry have been directed to the development of "dry" cable plugging materials. The most widely used of these are tapes or yarns impregnated with superabsorbent polymer materials.

U.S. Pat. No. 5,179,611 discloses a slotted rod type fiber optic cable that includes a water absorptive tape disposed between a jacket section and the slotted rod. The tape is a non-woven fabric, or other sheet-like material, which is typically coated or impregnated with a combination of a thermoplastic elastomer binding agent and a water absorptive resin combined with a water soluble resin. The optical fiber cable industry has established standards for cable performance under flooding conditions. For example, the Telcordia Technologies GR-20 Generic Requirements for Optical Fiber and Cable Industry standard requires that there be no transmission of water under a pressure head of one meter in twenty four hours through a one meter length of cable.

U.S. Pat. No. 4,867,526 discloses a cable having water blocking provisions wherein a tape is interposed between the cable core and jacket. The tape is a non-metallic, non-woven, web-like material impregnated with a so-called superabsorbent material. When exposed to water, the superabsorbent material swells dramatically to block passage of water along the cable.

U.S. Pat. No. 4,909,592 discloses improved impregnated tapes, which, in general, have been used widely and successfully for controlling cable flooding. The details in this patent are incorporated herein by reference. While not disclosed specifically therein, the superabsorbent polymer materials currently used in the industry are fine particulates.

In spite of impressive advancements in cable plugging technology for optical fiber cables, there remains a need for effective and inexpensive water blocking approaches. There is a special need for a water blocking means that is compact, and that operates with a minimum negative impact on microbending losses of the fibers in the cable.

SUMMARY OF THE INVENTION

We have discovered that the particle size of the particulates used for the superabsorbent materials in the yarns or tapes used for water blocking within the core tube of central core optical fiber cables has a direct effect on the microbending losses of the optical fibers in the cable. With the benefit of that discovery, we have developed a water blocking tape that comprises a fibrous substrate impregnated with a water absorptive, water insoluble, polymer, wherein the polymer is intertwined and interlocked with fibers of the fibrous substrate, and wherein the polymer comprises particulate material chosen to reduce microbending losses in the optical fibers. The particle size of the polymer superabsorbent is reduced substantially below that currently used in practice. We have found that by carefully controlling the particle size of the polymer powders used in the superabsorbent tape, along with other tape parameters, the result is a significant reduction in microbending losses. The use of ultra-fine particles for the superabsorbent material also allows tighter control, and an overall improvement, in the physical properties of the tape, mainly the tape thickness and weight. The latter are important parameters in cable design.

BRIEF DESCRIPTION OF THE DRAWING

Other objects and features of the present invention will be more readily understood from the following detailed description of specific embodiments when read in conjunction with the accompanying drawings, in which.

DETAILED DESCRIPTION OF THE INVENTION

Figure 1:
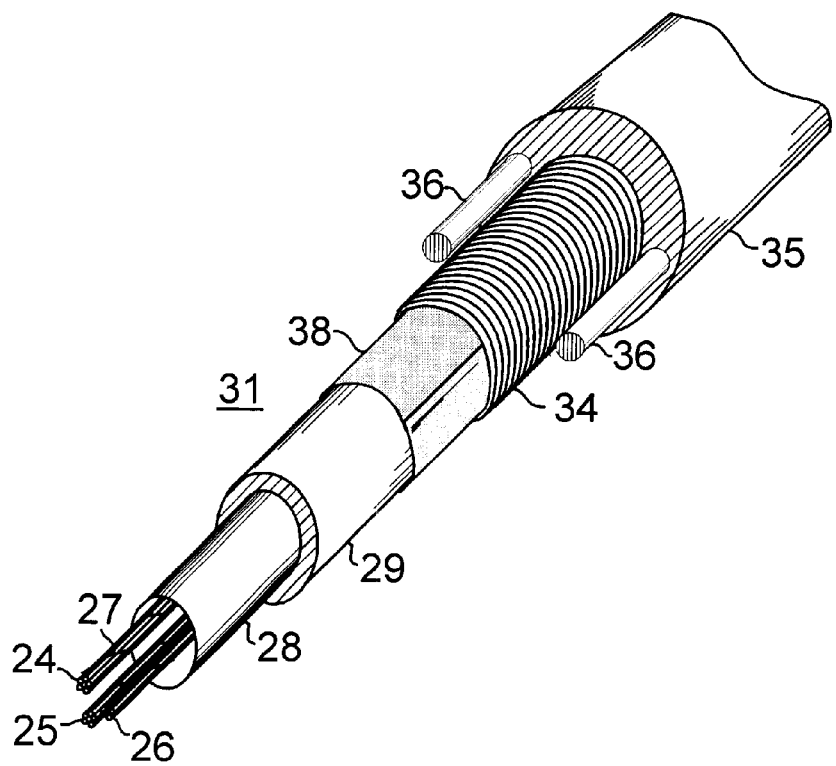
FIG. 1 is a perspective view of a communications cable having a core which includes a water blocking member and additionally shows various layers of the sheath system broken away. Some of the layers are exaggerated in thickness for purposes of clarity.
Figure 2:
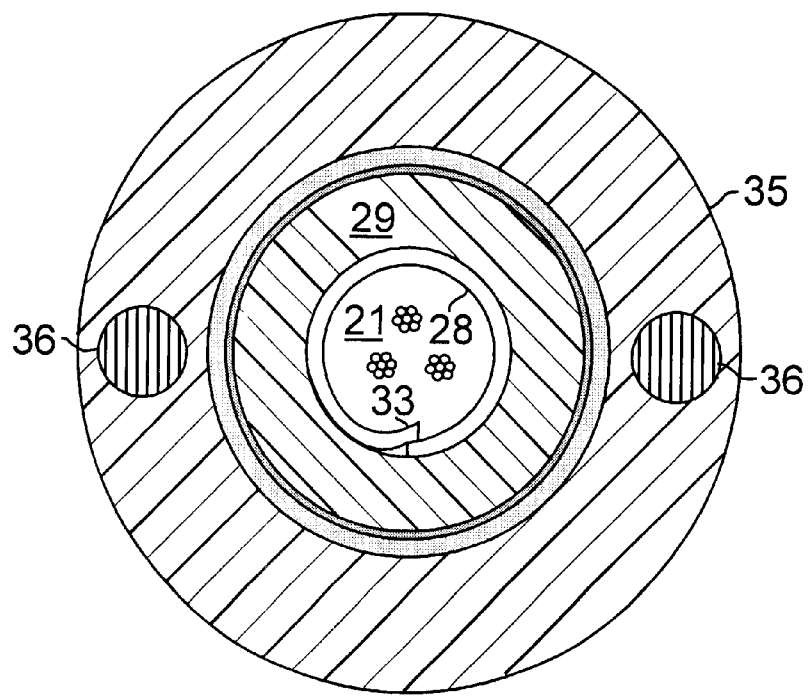
FIG. 2 is an end sectional view of the cable of FIG. 1, which illustrates the elements of the cable in greater detail.

A water blocking agent according to the invention comprises a fibrous substrate impregnated with water absorptive, water insoluble, polymer particles. Referring to FIGS. 1 and 2, there is shown a communications cable which includes a core 21 containing one or more bundles 24, 25, 26, of optical fibers which may be buffered with an outer layer of polyvinyl chloride (not shown). The bundles are typically wrapped with a binder ribbon 27. The core 21 includes a water blocking member 28 which is disposed within a core tube 29 of a sheath system 31. In the embodiment shown, the water blocking member 28 is tubular and disposed inside the core tube 29 as shown.

The water blocking member 28 in the preferred embodiment is in the form of a tape, which may comprise a fibrous substrate tape made of hydrophobic material, and which has been coated with a superabsorbent polymer powder. Advantageously, the coated tape is hydrophilic, and readily absorbs water. As can be seen, the tape 28 is wrapped loosely around the fiber bundles 24–26 and overlapped to produce seam 33. Due to the stiffness of the tape, it unfolds against the core tube as shown.

The core tube 29 is enclosed by a metallic shield 34 and an outer plastic jacket 35. The sheath system 31 also includes two diametrically opposed strength members 36. An additional tape 38 may be wrapped about an outer surface of the core tube 29. The tape 38 is a water blocking tape which may be the same as the tape 28.

The cable design shown in FIG. 1 is but one example of an optical fiber cable that may be used with the invention. Cables with fiber reinforced polymer and/or yarn strength members, i.e. non-metallic designs, may be preferred for applications where heavy (metal) armor is either undesirable or not required.

Figure 3:
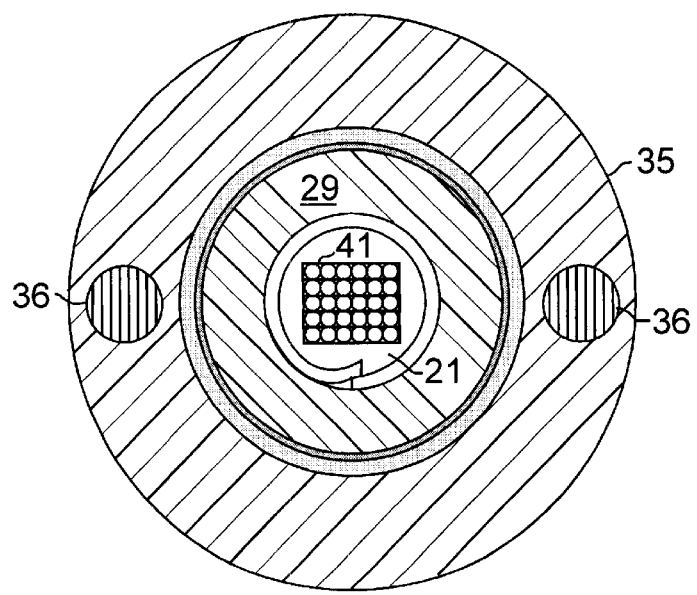
FIG. 3 is a view similar to that of FIG. 2 showing a cable carrying stacked ribbons of optical fibers.

FIG. 2 shows a fiber optic cable with optical fibers in three bundles. A variety of optical fiber configurations may be used in typical optical fiber cable designs. A commercially attractive embodiment is shown in FIG. 3 where the fibers are formed as ribbons, and stacked to provide the arrangement shown at 44.

Fibrous substrates used in superabsorbent tapes according to the invention may be either woven or non-woven, including woven or non-woven polyester, woven or non-woven fiberglass, or any other fibrous substrate that can be coated with a water based solution of superabsorbent particles. Examples of polyester fibrous substrates include spun-bonded polyester, calendered polyester, and polyester yarns. Tape substrates useful in the present invention may also be made of other polymers such as, polypropylene, nylon and Kevlar®. In the preferred implementation of the invention the tape is non-woven. For example, the tape may comprise a spunbonded non-woven polyester material that includes a web structure comprised of randomly-arranged fibers bonded primarily at the filament crossovers. Continuity of the fibers of the web, while not necessary to the invention, will provide the web with an increased tensile strength. The fibers may be formed of any plastic resin, or other appropriate material which has the capability of maintaining its shape in the presence of the temperatures encountered during the extrusion of the core tube 29. The fibers of the web structure are arranged so that air cells or pockets are formed.

A suitable tape substrate is polyethylene terephthalate. An example of this fiber product is known under the tradename "Reemay®" by BBA Nonwovens, Simpsonville, S.C. The Reemay.RTM. web structure is available in various thicknesses and densities from Reemay, Inc. of Old Hickory, Tenn. The properties of Reemay tapes are further defined and described in Bulletin R-1, dated Mar., 1986, entitled "Properties and Processing of Reemay Spunbonded Polyester" from E. I. du Pont de Nemours and Company, Incorporated, Wilmington, Del.

Other tape products suitable for the invention are available under the trade name TopSwell® and FreeSwell® available from GECA-TAPES B.V., Rijen, Netherlands; Firet® Cable Wrappings available from Lantor USA, Mansfield, Mass.; 3Q Tape Series and ZK Tape Series available from Fukuoka Cloth Industry, Fukuoka, Japan. Specific examples of suitable tapes are given in the following table.

TABLE I

| SUPPLIER AND PRODUCT | TAPE THICKNESS - MILS (mm) |
|---|---|
| Lantor USA 3E242 | 11.4 (0.290) |
| Fukuoka Cloth Industry 3Q303 | 7.2 (0.183) |
| Fukuoka Cloth Industry ZK0809N | 11.9 (0.302) |
| Fukuoka Cloth Industry ZK 1610 | 12.6 (0.320) |

It should be evident that various other grades and brands of polyester tape or other similar materials may be used. These examples are given as examples of suitable tape substrates. The impregnation or coating of those substrates should follow the teachings of the invention.

Practical material thickness may range from 4 to 14 mils thick. These values, as well as other values given in this specification, by no means limit the invention but represent the presently preferred ranges. From the standpoint of reducing the volume occupied by the tape in the cable core, an advantage in many cable designs, tapes with a thickness of less than 12 mils are preferred.

Thickness of the tapes 28 and 38 also is important from another standpoint. Cable duct space is typically limited, and telecommunication service providers generally prefer to use the smallest cable possible. Minimizing tape thickness contributes to reducing the overall size of the cable. Also, in order to allow the cable to be terminated by standard size hardware, the diameter of the cable should be maintained within a desired range. Accordingly, the thickness of each element of the sheath system should be considered. Therefore, the thickness of the tape is chosen for minimum thickness while maintaining desirable porosity and tensile strength.

Related to the tape thickness in terms of the effectiveness of the tape product for both water blocking and for avoiding increased microbending losses is the density (mass per unit area) of the loaded tape. For the purposes of the invention this is an important parameter which will be dealt with below.

A calendered polyester tape is preferred for use in the invention. However, others kinds of tapes may also be used. For example, the tape which is to be impregnated may be polyester spunbonded fabric, nylon spunbonded fabric, non-woven glass, polypropylene melt blown non-woven fabric, polyurethane spunbonded fabric or TCF cellulose fabric.

An important characteristic of the substrate tape is stiffness. Within limits, as the material of the substrate tape is made increasingly stiffer, it is still relatively easy to form the tape longitudinally about the units 24, 25, 26 without wrinkling. However, it is important that the material have sufficient memory so that it tends to spring outwardly into engagement with the inner surface of the core tube 29. A longitudinally wrapped arrangement is preferred over a helical wrap from the standpoint of minimizing the overall diameter of the cable.

Stiffness of the material for the substrate tape is controlled by a combination of factors such as the number of polyester fibers per unit volume, thickness of the material, size of the fibers, and the amount and type of binder used in the material. Increasing the thickness of the material obviously increases the cost of the material per unit of surface area of cable covered. Increasing the number of the fibers per unit volume or increasing the amount of binder tends to decrease the ability of the material to prevent heat transfer. Thus, at least four factors: formability of the tape 28, cost of the tape, insulation capability of the tape, and water blocking performance, should be considered and balanced in providing the proper material for use on a particular cable.

The substrate of an impregnated tape also possesses specific properties such as porosity and tensile strength which enhance its use as a water blocking element for a cable, particularly for communications cable. The tape should have both relatively high porosity and relatively high tensile strength. For a given tape width, the tensile strength decreases as the thickness decreases. Although a larger thickness is desired insofar as tensile strength is concerned, a larger thickness may result in a larger cable diameter. These parameters should be balanced. The materials and tape thickness recommended here provide suitable tensile strength.

In order to render the substrate tape swellable upon contact with moisture, the substrate tape is impregnated or coated with a suitable water swellable material, which is typically a polymer, and herein is referred to as a superabsorbent polymer.

Advantageously, in response to contact with water, the superabsorbent polymer in the cable structure swells to block the flow of water, especially water that flows in a longitudinal direction. The superabsorbent polymer also forms a gel and changes the viscosity of the ingressed water at the point of contact with the superabsorbent polymer, making it more viscous and consequently developing more resistance to water flow. As a result, the cable of this invention is able to meet industry standards with respect to the flow of water longitudinally along the cable from a point of entry.

Superabsorbents are hydrophilic materials, which can absorb and retain water without dissolution in the fluid being absorbed. See J. C. Djock and R. E. Klern "Review of Synthetic and Starch-Graft Copolymer Superabsorbents" prepared for the Absorbent Products Conference held Nov. 16–17, 1983 in San Antonio, Tex. and incorporated herein by reference. Properties such as enzyme stability, biodegradability, absorbent capacity, and rate of uptake are used to characterize a superabsorbent material. One of the early superabsorbents was a saponified starch graft polyacrylonitrile copolymer. See U.S. Pat. No. 3,425,971, which discloses saponifying starch-graft polyacrylonitrile copolymers with aqueous bases.

The two major superabsorbents, which are available today, are cellulosic or starch-graft copolymers and synthetic superabsorbents. There are essentially two classes of synthetic superabsorbents, polyelectrolytes and nonelectrolytes. Polyelectrolytes are the most important and fall into four classes: polyacrylic acid superabsorbents, polymaleic anhydride-vinyl monomer superabsorbents, polyacrylonitrile-based superabsorbents and polyvinyl alcohol superabsorbents. Those most commonly engineered for the specific application of water blocking in communication cables are crosslinked polyacrylate powders (also known as xerogellants, polyelectrolytes and hydrogels). This polymer class includes, for example, polymers made with monomers of polyacrylamide, monomers of acrylic acid, and monomers of polyacrylamide-acrylic acid copolymers. The superabsorbent polymer contains carboxyl groups that, when wetted, form carboxylates ($COO^-$). These carboxylates force the polyacrylate chains to "uncoil", resulting in a rapid and dramatic increase in hydrodynamic volume. Practical experience with the use of these materials indicates that the swelling speed and gel strength are important characteristics in their performance.

The polyacrylic acid class of superabsorbents includes both homopolymers and copolymers of acrylic acids and acrylate esters. The monomer units usually are polymerized to produce a water-soluble polymer, which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually the carboxylates just described, and the cross-linking density.

The cross-linking density affects not only the absorbency, but also the time required to absorb, and the strength of the gel formed. Generally, the higher the cross-linking density, the stronger the gel formed. The time to reach absorbent capacity decreases as the cross-linking density increases, and the absorbent capacity decreases.

The water absorbing composition used with the present invention can be applied to yarns or tapes or sheets depending upon the particular dimensions and characteristics of the fibrous substrate utilized and the application for which it is intended. When tapes are used the tapes typically run in a linear longitudinal direction along the axis of the cable and are folded to cover the optical fibers as shown in FIG. 2. Alternatively, tapes or yarns may be helically wrapped longitudinally around the yarn or tape along the axis of the cable core. Water blocking tapes may also be incorporated in cables by concentric multi-layered wrapping at splice junctions, terminals and other connections. Various other methods of using the superabsorbent tape of the present invention will occur to those skilled in the art.

The amount of superabsorbent polymer loaded into the polyester tape matrix is reflected in a parameter of mass per unit area of the finished tape. It was found that this parameter, which includes the mass of the substrate material, and the amount of superabsorbent powder and any binders or adhesives, in addition to the particle size discussed in more detail below, are important in effectively blocking water penetration in state of the art optical fiber cables. Experiments have established that a tape having a total mass per unit area of at least 40 $gm/m^2$ is desirable, and at least 65 $g/m^2$ is preferred, in order to provide adequate water swellability, and provide cushioning in the space between the optical fiber and the core sidewall.

The polymer powder may be applied to both sides of the tape, or may be applied only to one side. In some embodiments, powder is applied between two tapes sandwiched together. From the standpoint of minimizing the tape volume in the cable, a "single-sided" tape is preferred, i.e. a tape in which the powder is applied to one side of a single non-woven substrate. From the standpoint of controlling microbending losses, it was recognized that the single-sided impregnated tape has a "smooth" side and a relatively rough side, where the polymer particles are deposited. Wrapping the fiber bundle(s) longitudinally, as described above, with the "smooth" side in contact with the fibers, provides an additional cushion against mechanical deformation.

In each example given above, the superabsorbent material comprises a polymer in powder form. The powder is mixed with water and applied to the tape using known techniques.

Figure 4:
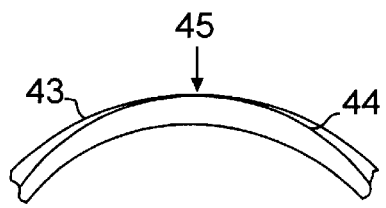
FIG. 4 is a simple diagram showing typical movement of optical fibers in a cable when the cable bends.
Figure 5:
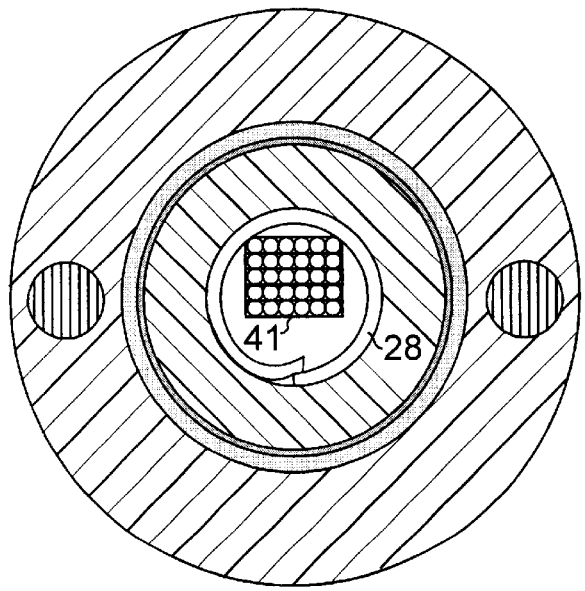
FIG. 5 is a view of FIG. 3 after bending as shown in FIG. 4.

After extensive experimentation, we have verified that the optical performance of the optical fibers in a typical cable configuration, mainly the microbending loss for a given cable deformation, is sensitive to the particles used in making the superabsorbent tape. With reference to FIG. 4, when the cable is bent the optical fibers 44 are biased against the outer wall of the inner cable sheath 43 (the wall with the largest curvature diameter) as shown in the figure. As mentioned earlier, the fibers are usually allowed to float in the interior tube of the cable so that the effect described by FIG. 4 can be pronounced. When the cable is deformed or bent, which typically occurs during installation, the optical fibers within the cable are pressed against the interior cable sheath wall, e.g. at point 45, with considerable force. The effect is also illustrated in FIG. 5 where fiber bundle 41 has been pushed against the outer confines of the tube. The same effect occurs when the cable is compressed, i.e. crushed. In both instances it will be intuitively appreciated that if there are discrete particles in the space between the glass fiber and the interior wall of the cable, the glass fiber will "feel" the particle. If the particle is large enough, it will cause microbending loss in the optical signal transmitted through the fiber.

In engineering the superabsorbent tape the absorbing characteristics of the polymer particles favor using relatively large particles. As mentioned earlier, the. important performance characteristics of superabsorbent polymers include hydrophicity and the rate of swelling. In a comparison between a 200 micron particle and a 300 micron particle (a 50% larger diameter), and given a swell volume increase factor of 10, the 200 micron particle will occupy $4.2 \times 10^7$ cubic microns of the void space in the cable while the 300 micron particle will occupy $14.14 \times 10^7$ cubic microns, a volume difference of 33% in favor of the 50% no larger particle. Since it is known that the large particle will reach an equivalent volume faster than the smaller particle, and will occupy a much larger void space in the cable, it is evident that relatively large polymer particles should be favored for this application.

Figure 6:
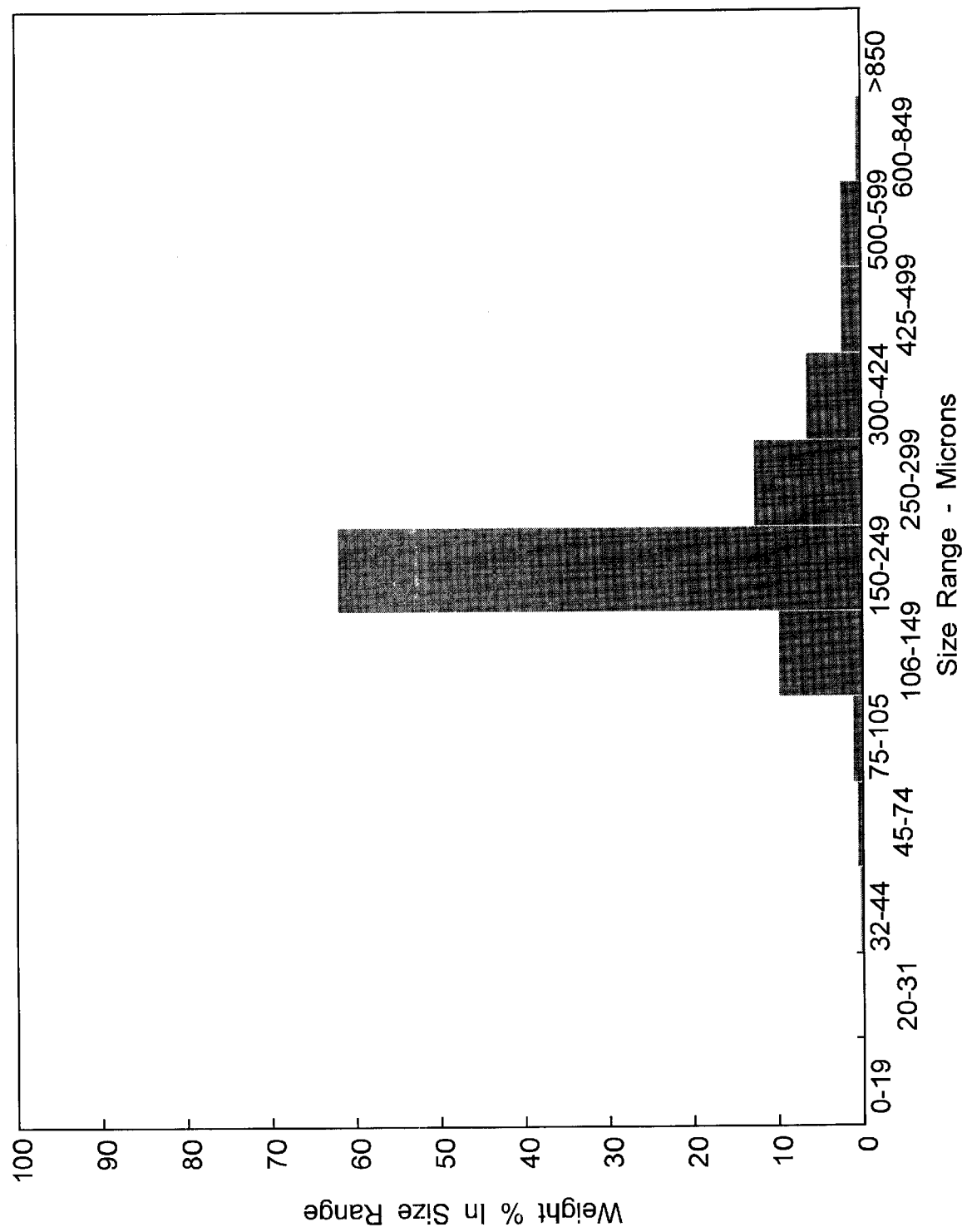
FIGS. 6 and 7 are plots showing particle size distribution for particles in a superabsorbent polymer powder.

A distribution plot for a conventional superabsorbent polymer powder product is shown in FIG. 6. The weight fraction of the product with particles over 250 microns diameter is substantial, i.e. more than 20%, and the weight fraction of very large particles (over 300 microns) is approximately 10%.

However, unknown prior to this invention is that there is a trade-off in particle size that occurs at particle sizes greater than approximately 200 microns. Particles in this range and above have been found to adversely affect the optical performance of the cable. Measurements show that optical fiber cables that are made with superabsorbent polymer tapes having the particle distribution shown in FIG. 6 show undesirable performance and failure rates.

According to the invention, the size distribution of the polymer particles in the superabsorbent tape is restricted below the normal range. This new range is defined as follows in terms of the weight fraction of particles in the mixture:

Less than 10% weight fraction over 250 microns, less than 2% weight fraction over 300 microns.

Since the size distribution of the particles in a typical powder product is described by a curve, two points are given above to better define the desired distribution. This is considered an acceptable particle range.

A preferred particle range is defined by:

Less than 5% weight fraction over 250 microns, less than 0.1% weight fraction over 300 microns.

Figure 7:
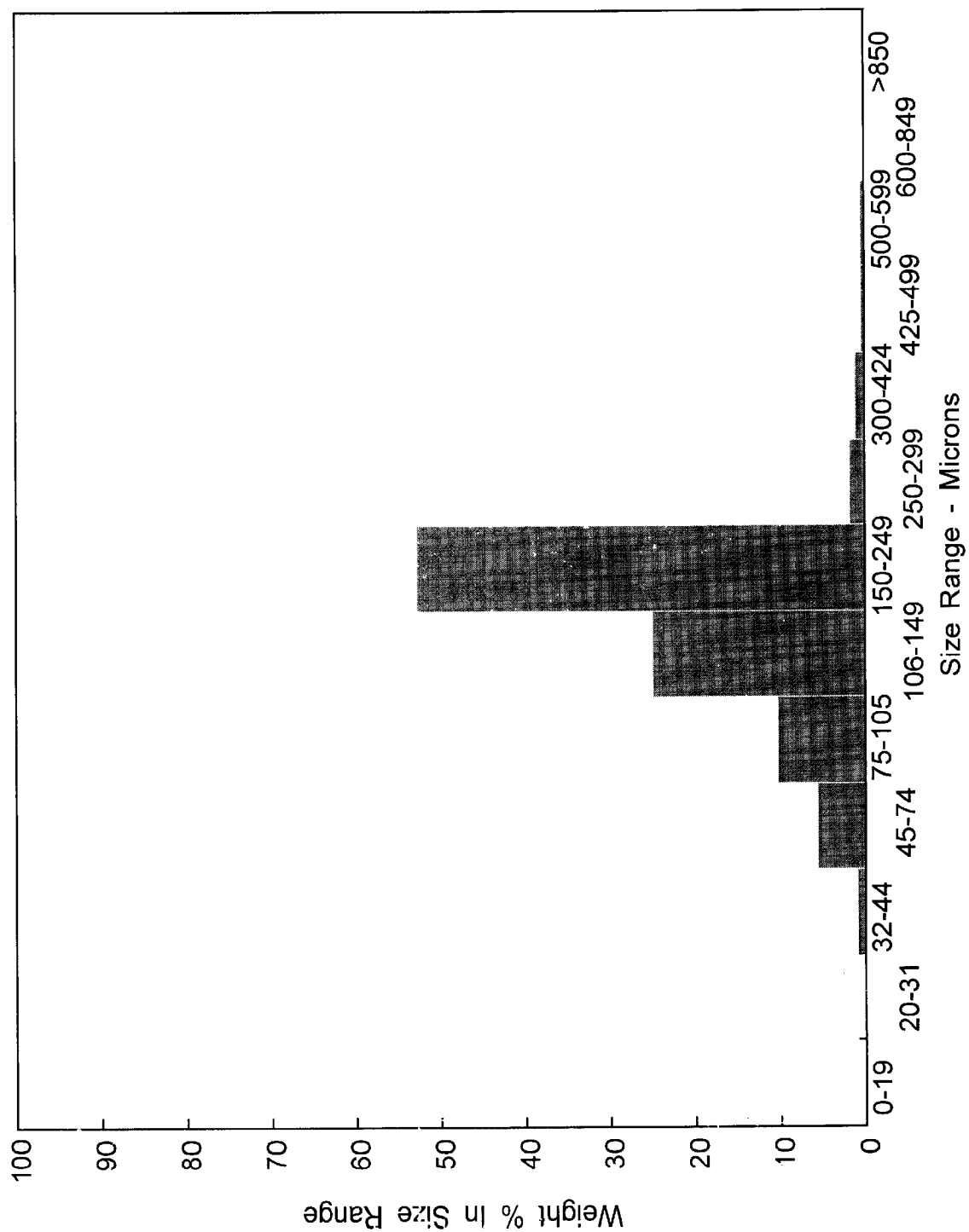

A particle distribution graph for a superabsorbent tape polymer powder according to the invention is shown in FIG. 7. A powder that meets this specification is Norsocryl XFS, available from Atofina Superabsorbent Polymers, ⅛ Cours Michelet, 92800, Puteaux, France.

Those skilled in the art will appreciate that the phenomenon addressed by the invention is primarily physical, and that it is equally applicable to superabsorbent polymer powders of any chemical composition.

The following examples are given to demonstrate the practice of the invention.

EXAMPLE I

A calendered polyester tape 28 is impregnated with a superabsorbent polymer comprising a sodium salt of polyacrylic acid in which all the carboxylic groups may or may not be reacted with sodium. In other words, it is saponified in whole or in part. The level of saponification, which may fall within a relatively wide range, depends on desired properties. The superabsorbent polymer is in the form of a powder with the size distribution shown in FIG. 7. After the tape 28 has been impregnated, the superabsorbent material is dried to provide a film on the tape. The impregnated tape 28 has a density of about 1.1 to 1.8 ounces per square yard, which includes the density of the untreated tape, increased 10 to 80%, i.e. the add-on, by the treating material.

EXAMPLE II

In another embodiment, a Reemay spunbonded polyester tape is impregnated with an aqueous solution comprising acrylates and acrylamide polymer powders mixed with water. The superabsorbent polymer is in the form of a powder with the size distribution shown in FIG. 7. The tape impregnated with such a composition has a density, which may represent an increase as high as about 80% of the density of the untreated tape. In each of the embodiments just described, the impregnating material is a mixture of water or other liquid media and a superabsorbent material in which the mixture comprises about 4 to 24% solids when the impregnating material is an aqueous solution and applied.

EXAMPLE III

A superabsorbent polymer tape was prepared using a 40 gm/m² polyethylene terepthalate substrate tape coated with 25 gm/m² XFS powder, 3% Cu inhibitor, and 4.5 g polyvinyl alcohol (binder). After impregnating, the properties of the tape were measured and are shown in TABLE II.

EXAMPLE IV

A superabsorbent polymer tape was prepared using a 40 gm/m² polyethylene terepthalate substrate tape coated with 25 gm/m² XFS powder, 3% Cu inhibitor, and 9 g polyvinyl alcohol (binder). After impregnating, the properties of the tape were measured and are shown in TABLE II.

TABLE II

| Property | EXAMPLE III | EXAMPLE IV |
| --- | --- | --- |
| Weight - g/sqm | 78.6 | 73.5 |
| Thickness - mm (mils) | 0.21 (8.3) | 0.23 (9.1) |
| Tensile strength - N/5cm | 165.5 | 174.4 |
| Elongation - % | 12.85 | 12.3 |
| Moisture content - % | 6.3 | 7.1 |
| Swelling height Max - mm | 10.6 | 10.8 |
| Swelling height 1 min - mm | 9.5 | 10.2 |

A surfactant may optionally be added to facilitate wetting of fibers in the fibrous substrate so that the water absorbing solution is sufficiently in contact with the fibers to ensure effective intertwining and interlacing of the superabsorbent powders within the fibers of the substrate. An example of a surfactant useful with fiberglass fibrous substrates is alcohol ethoxy sulfate, available under the trade name Sterol CS-460 from Van Waters & Rogers, Inc.

In the cable structure disclosed above it is useful to have free space in the cable so that, when the cable bends, the optical fibers are not excessively stressed. Because of the intentional provision of substantial voids, the optical fibers are allowed to undergo substantial transverse movement within the core tube 28.

In one embodiment, the ratio of the sum of the cross-sectional areas of all the optical fibers in the core tube 28 to the cross-sectional area defined by the inner wall of the core tube does not exceed a predetermined value of about 0.5. Control of this area ratio helps insure that the media within the core are decoupled from the sheath system in the transverse direction to reduce microbending of the optical fibers.

It should be evident that the water blocking provisions of this invention may be included in a cable with strength member systems other than those thus far described. For example, the invention is useful for the cable design of U.S. Pat. No. 4,765,712 which issued on Aug. 23, 1988 in the names of W. D. Bohannon, Jr., et al. and which is incorporated herein by reference. The sheath system may also be the well-known cross-ply system that is disclosed in U.S. Pat. No. 4,241,979, which issued on Dec. 30, 1980 in the names of P. F. Gagen and M. R. Santana.

To further demonstrate the invention, experiments were performed with three prior art tapes known to have particle sizes larger than those specified above. The test protocol is from the Telcordia Technologies (formerly Bellcore) standard GR-20-CORE, "Generic Requirements for Optical Fiber and Cable", Issue 2, July 1998. This document is the widely accepted industry standard for fiber optic cables in the US. Telcordia documents may be obtained from Telcordia Customer Service, 8 Corporate Place—Room 3A-184, Piscataway, N.J. 08854-4156.

It was found that tapes made in accordance with the invention lead to good optical performance, e.g. low fiber attenuation that passes industry standard requirements, in the mechanical tests in the GR-20 specification. To quote Page 6–17 of GR-20 (Section 6.5.2) concerning mechanical tests:

"Rationale: The testing stresses defined in this section represent single events that the cable may be exposed to during installation. The cable structure shall be capable of withstanding these forces without an increase in fiber attenuation after the stress is removed. (Exceptions are cable compression and low and high temperature bend, because it is possible for cables to be exposed to these stresses in an installed environment. For these tests, attenuation measurements are made while the cable is under load.)."

Results of the above described tests showed that all three prior art tapes produced poor optical performance. By way of contrast the use of tapes with particles in the size range of the invention consistently resulted in no adverse effects on performance.

Specifically, use of the inventive tape results in improvements in fiber attenuation (aka "optical loss") over the prior art tapes in the Low and High Temperature Cable Bend Test, Section 6.5.3. of Telcordia GR-20, and the Tensile Strength of Cable Test, Section 6.5.6 of Telcordia GR-20. As noted in the Telcordia document, these tests are widely accepted models of mechanical loading of optical cables during installation and service.

The Low and High Temperature Cable Bend Test follows the procedures specified in Electronic Industries Association standard test EIA-455-37A, "FOTP-37: Low and High Temperature Bend Test For Fiber Optic Cable". The Tensile strength of Cable Test follows procedures specified in Electronic Industries Association standard test EIA455-33A, "FOTP-33: Fiber Optic Cable Tensile Loading and Bending Test".

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. A communications cable with a longitudinal axis, comprising:
   a. a centrally disposed core extending along the longitudinal axis of the cable,
   b. a core tube which defines a substantially circular area disposed generally concentrically about the longitudinal axis of the cable and which encloses the core,
   c. a sheath system which includes a jacket which comprises a plastic material and which encloses the core tube;
   d. at least one optical fiber in the core, arranged so as to leave intentional voids in the core tube,
   e. at least one longitudinally extending water blocking member which is disposed within said core tube and essentially encloses the optical fiber to prevent the flow of water longitudinally along the longitudinal axis of the cable, the water blocking member comprising:
      i. a substrate tape comprising a non-woven fibrous polymer matrix,
      ii. a superabsorbent polymer powder coating on at least one side of the substrate tape, the superabsorbent polymer coating consisting essentially of particles having less than 10% weight fraction over 250 microns in diameter, and less than 2% weight fraction over 300 microns in diameter.

2. The communications cable of claim 1, wherein the superabsorbent polymer consists essentially of particles having less than 5% weight fraction over 250 microns in diameter, and less than 1% weight fraction over 300 microns in diameter.

3. The communications cable of claim 1 wherein the water blocking member has a total mass per unit area of at least 40 grams/sq. meter.

4. The communications cable of claim 2 wherein the water blocking member has a total mass per unit area of at least 65 grams/sq. meter.

5. The communications cable of claim 1, wherein the core includes a plurality of optical fibers in a ribbon stack.

6. The communications cable of claim 1, wherein the core includes a plurality of optical fibers in at least one bundle wrapped with a binder thread.

7. The communications cable of claim 1 wherein the substrate tape essentially covers the inside wall of the core tube.

8. The communications cable of claim 5 wherein the substrate tape is wrapped around the ribbon stack with a tape seam extending along the longitudinal axis of the cable.

9. The communications cable of claim 1 wherein the substrate tape is coated on one side of the tape and the coated side of the substrate tape is in contact with the core tube.

10. The communications cable of claim 1 wherein the sheath system includes a strength member.

11. The cable of claim 1 wherein the tape is a calendered polyester material.

12. The cable of claim 1 wherein the tape is a spunbonded polyester material.

13. The cable of claim 1 wherein the superabsorbent polymer coating comprises an adhesive for bonding the superabsorbent polymer to the substrate tape.

14. The cable of claim 11 wherein said tape is impregnated with a mixture which comprises water and a superabsorbent material in which the mixture comprises about 4 to 24% by weight of solids.

15. The cable of claim 14 wherein the coated tape is 10 to 80% greater than the density of the tape substrate.

16. The cable of claim 1 wherein superabsorbent polymer powder comprises acrylate acrylamide.

17. The cable of claim 11 wherein the substrate tape has a thickness of less than 12 mils.

18. The cable of claim 1 wherein the superabsorbent polymer is selected from the group consisting of (1) polyacrylic acid; (2) polyacrylamide; blends of (1) and (2); salts of (1) and (2); and copolymers of (1) and (2).

* * * * *